US012172440B2

(12) United States Patent
Komatsu et al.

(10) Patent No.: US 12,172,440 B2
(45) Date of Patent: Dec. 24, 2024

(54) LIQUID JETTING STRUCTURE, LIQUID JETTING HEAD, AND LIQUID JETTING DEVICE

(71) Applicant: FUJIFILM Corporation, Tokyo (JP)

(72) Inventors: Hiroshi Komatsu, Kanagawa (JP); Tsutomu Yokouchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 111 days.

(21) Appl. No.: 17/890,258

(22) Filed: Aug. 17, 2022

(65) Prior Publication Data

US 2022/0388306 A1 Dec. 8, 2022

Related U.S. Application Data

(63) Continuation of application No. PCT/JP2021/005490, filed on Feb. 15, 2021.

(30) Foreign Application Priority Data

Mar. 30, 2020 (JP) ................................. 2020-061103

(51) Int. Cl.
*B41J 2/14* (2006.01)
*B41J 2/18* (2006.01)

(52) U.S. Cl.
CPC ............ *B41J 2/14201* (2013.01); *B41J 2/18* (2013.01); *B41J 2002/14306* (2013.01); *B41J 2202/03* (2013.01)

(58) Field of Classification Search
CPC ................................ B41J 2/14201; B41J 2/18; B41J 2002/14306; B41J 2202/03; B41J 2/161;

(Continued)

(56) References Cited

U.S. PATENT DOCUMENTS 7,441,871 B2 10/2008 Nishijima
8,136,920 B2 3/2012 Sakurai et al.

(Continued)

FOREIGN PATENT DOCUMENTS

CN 1847001 10/2006
CN 101284447 10/2008

(Continued)

OTHER PUBLICATIONS

"Office Action of Japan Counterpart Application", issued on Mar. 7, 2023, with English translation thereof, p. 1-p. 7.

(Continued)

*Primary Examiner* — Jason S Uhlenhake
*Assistant Examiner* — Alexander D Shenderov
(74) *Attorney, Agent, or Firm* — JCIPRNET

(57) ABSTRACT

Provided are a liquid jetting structure and its applications. The liquid jetting structure includes: a nozzle substrate on which a nozzle for jetting a liquid is formed; and a flow passage substrate on which a liquid flow passage communicating with the nozzle is formed, in which a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON.

14 Claims, 3 Drawing Sheets

(58) Field of Classification Search
CPC ...... B41J 2/1623; B41J 2/1628; B41J 2/1642; B41J 2/1646; B41J 2/1606
USPC .............................................................. 347/1
See application file for complete search history.

(56) References Cited

U.S. PATENT DOCUMENTS

| | | | |
|---|---|---|---|
| 8,657,410 B2 | 2/2014 | Nakahashi et al. | |
| 9,090,064 B2 | 7/2015 | Nihei | |
| 9,302,481 B2 | 4/2016 | Tadachi et al. | |
| 9,327,500 B2 | 5/2016 | Nagatoya et al. | |
| 2003/0197758 A1* | 10/2003 | Sasaki | B41J 2/1606 347/45 |
| 2008/0129780 A1 | 6/2008 | Cha et al. | |
| 2008/0136866 A1* | 6/2008 | Okamura | C23C 16/30 347/45 |
| 2010/0053269 A1 | 3/2010 | Fujii et al. | |
| 2011/0069118 A1* | 3/2011 | Ohzeki | B41J 2/14233 347/44 |
| 2013/0335483 A1* | 12/2013 | Sung | B41J 2/1603 347/45 |
| 2014/0183284 A1* | 7/2014 | Nagatoya | B41J 2/1433 239/548 |
| 2014/0184705 A1 | 7/2014 | Wakamatsu et al. | |
| 2017/0361610 A1 | 12/2017 | Hara et al. | |
| 2018/0179632 A1 | 6/2018 | Teranishi | |

FOREIGN PATENT DOCUMENTS

| | | |
|---|---|---|
| CN | 102909955 | 2/2013 |
| CN | 103085481 | 5/2013 |
| CN | 103895347 | 7/2014 |
| CN | 103895348 | 7/2014 |
| CN | 107521231 | 12/2017 |
| CN | 110520302 | 11/2019 |
| CN | 110831769 | 2/2020 |
| JP | 2009184176 | 8/2009 |
| JP | 2009220471 | 10/2009 |
| JP | 2010076422 | 4/2010 |
| JP | 2014124876 | 7/2014 |
| JP | 2014124882 | 7/2014 |
| JP | 2014124887 | 7/2014 |
| JP | 2018103382 | 7/2018 |
| JP | 2019038126 | 3/2019 |
| WO | 2019012828 | 1/2019 |

OTHER PUBLICATIONS

"International Search Report (Form PCT/ISA/210) of PCT/JP2021/005490," mailed on Apr. 20, 2021, with English translation thereof, pp. 1-6.
"Written Opinion of the International Searching Authority (Form PCT/ISA/237)" of PCT/JP2021/005490, mailed on Apr. 20, 2021, with English translation thereof, pp. 1-8.
"Office Action of Japan Counterpart Application" with English translation thereof, issued on Dec. 20, 2022, p. 1-p. 6.
"Search Report of Europe Counterpart Application", issued on Aug. 11, 2023, p. 1-p. 7.
"Office Action of China Counterpart Application", issued on Jan. 31, 2024, with English translation thereof, p. 1-p. 11.
"Office Action of China Counterpart Application", issued on Jul. 20, 2024, with partial English translation thereof, p. 1-p. 12.

* cited by examiner

LIQUID JETTING STRUCTURE, LIQUID JETTING HEAD, AND LIQUID JETTING DEVICE

CROSS-REFERENCE TO RELATED APPLICATION

This application is a Continuation of International Application No. PCT/JP2021/005490, filed Feb. 15, 2021, which claims priority to Japanese Patent Application No. 2020-061103 filed Mar. 30, 2020. Each of the above applications is hereby expressly incorporated by reference, in its entirety, into the present application.

BACKGROUND OF THE INVENTION

1. Field of the Invention

The present disclosure relates to a liquid jetting structure, a liquid jetting head, and a liquid jetting device.

2. Description of the Related Art

Generally, a liquid jetting head represented by an ink jet head mounted on an ink jet recording device has a nozzle for jetting a liquid. The liquid is supplied from a liquid supply chamber to a liquid flow passage and is jetted from a nozzle hole formed in the nozzle connected to the liquid flow passage.

For example, JP2009-184176A discloses a liquid droplet jetting head comprising a nozzle substrate comprising a plurality of nozzle holes comprising at least a nozzle portion that jets liquid droplets and an introduction portion having a larger cross-sectional area than the nozzle portion and provided coaxially with the nozzle portion, in which the nozzle substrate has a plurality of layers of jetting liquid-resistant protective films formed at least on an inner wall of the nozzle holes. In addition, JP2014-124876A discloses a liquid droplet ejection head comprising a nozzle plate in which a plurality of nozzle openings are provided on a silicon substrate, a hafnium oxide film or a zirconium oxide film formed by atomic layer deposition is provided on both surfaces of the silicon substrate and a nozzle opening inner surface, and a plasma polymerization film of a silicone material is provided on the hafnium oxide film or the zirconium oxide film on a jetting surface. In addition, JP2009-220471A discloses a liquid jetting head that includes a nozzle plate formed with nozzle holes for jetting liquid droplets and jets a liquid from the nozzle holes by pressurizing the liquid in a liquid chamber communicating with the nozzle holes, in which titanium or a titanium oxide film is formed on a jetting side on a surface of the nozzle plate, a silicon oxide film is formed on the titanium or titanium oxide film, a water-repellent layer is formed on the silicon oxide film, a silicon oxide film is formed on a liquid chamber side and an inner wall of the nozzle hole on the surface of the nozzle plate, the titanium or titanium oxide film is covered with a silicon oxide film, an interface between the silicon oxide film and the titanium or titanium oxide film is not exposed on a liquid contact surface.

SUMMARY OF THE INVENTION

A component contained in a liquid adhere to a jetting surface of a liquid jetting head as foreign matter because of drying after the liquid is jetted. In a case where foreign matter adheres to a nozzle surface, jetting failure is likely to occur. Therefore, in a liquid jetting device, foreign matter can be removed by periodically wiping the jetting surface of the liquid jetting head. However, durability of the jetting surface of the liquid jetting head may decrease by wiping, and durability against wiping (hereinafter, also referred to as "wipe resistance") is required.

In a case where an alkaline liquid is used, durability of the jetting surface of the liquid jetting head and a liquid flow passage may decrease, and durability against alkali (hereinafter, also referred to as "alkali resistance") is required.

On the other hand, in JP2009-184176A, a silicon oxide film, a metal oxide film, and a water-repellent film are provided in this order on the jetting surface. Since adhesiveness between the water-repellent film and the metal oxide film is insufficient, the jetting surface is considered to be inferior in wipe resistance.

In JP2014-124876A, a hafnium oxide film or a zirconium oxide film, a plasma polymerization film of a silicone material, and a liquid-repellent film are provided in this order on the jetting surface. The plasma polymerization film has few bonding points and many pinholes. Therefore, adhesiveness between the liquid-repellent film and the plasma polymerization film is insufficient, and the jetting surface is considered to be inferior in wipe resistance.

In JP2009-220471A, titanium or a titanium oxide film and a silicon oxide film are provided in this order on a part of the inner wall of the nozzle hole. However, only the silicon oxide film is provided on the liquid chamber side on the surface of the nozzle plate, and it is considered to be inferior in alkali resistance.

The present disclosure has been made in view of such circumstances, and an object to be achieved by an embodiment of the present invention is to provide a liquid jetting structure, a liquid jetting head, and a liquid jetting device, in which a jetting surface is excellent in wipe resistance and the jetting surface and a liquid flow passage are excellent in alkali resistance.

The present disclosure includes the following aspects.

<1> A liquid jetting structure comprising: a nozzle substrate on which a nozzle for jetting a liquid is formed; and a flow passage substrate having a liquid flow passage communicating with the nozzle, in which a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON.

<2> The liquid jetting structure according to <1>, in which the first layer is a layer of tantalum oxide, zirconium oxide, or hafnium oxide.

<3> The liquid jetting structure according to <1> or <2>, in which the second layer is a $SiO_2$ layer.

<4> The liquid jetting structure according to any one of <1> to <3>, in which a thickness of the first layer is 10 nm to 50 nm.

<5> The liquid jetting structure according to any one of <1> to <4>, in which a thickness of the second layer is 0.3 nm to 3 nm or 10 nm to 100 nm.

<6> The liquid jetting structure according to any one of <1> to <5>, in which a thickness of the second layer is 0.3 nm to 2 nm.

<7> The liquid jetting structure according to any one of <1> to <6>, in which a ratio of a thickness of the second layer to a thickness of the first layer is 0.006 to 0.3.

<8> The liquid jetting structure according to any one of <1> to <7>, in which the liquid-repellent layer contains a silicon compound having a perfluoropolyether structure.

<9> The liquid jetting structure according to any one of <1> to <8>, in which a thickness of the liquid-repellent layer is 3 nm to 8 nm.

<10> The liquid jetting structure according to any one of <1> to <9>, in which the liquid flow passage has a circulation flow passage for circulating a liquid.

<11> A liquid jetting head comprising: the liquid jetting structure according to any one of <1> to <10>.

<12> A liquid jetting device comprising:

the liquid jetting head according to <11>.

<13> The liquid jetting device according to <12>, further comprising: a liquid circulation mechanism that circulates a liquid between the liquid jetting head according to <11> and a liquid tank.

According to the present disclosure, there are provided a liquid jetting structure, a liquid jetting head, and a liquid jetting device, in which a jetting surface is excellent in wipe resistance and the jetting surface and an internal flow passage are excellent in alkali resistance.

DESCRIPTION OF THE PREFERRED EMBODIMENTS

Figure 1:
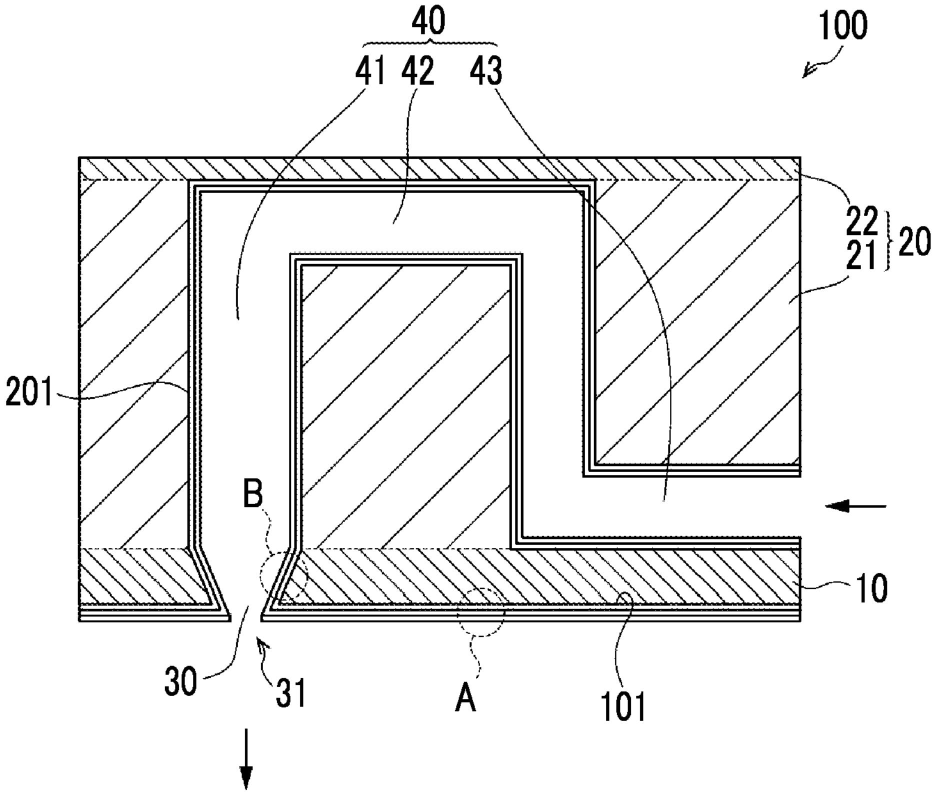
FIG. 1 is a schematic cross-sectional view showing an embodiment of a liquid jetting structure of the present disclosure.

Hereinafter, a liquid jetting structure, a liquid jetting head, and a liquid jetting device of the present disclosure will be described in detail.

In the present disclosure, a numerical range shown using "to" indicates a range including the numerical values described before and after "to" as a lower limit value and an upper limit value.

In the present disclosure, in a case where a plurality of substances corresponding to respective components in a composition are present, the amount of the respective components in the composition indicates the total amount of the plurality of substances present in the composition unless otherwise specified.

In a numerical range described in a stepwise manner in the present disclosure, an upper limit value or a lower limit value described in a certain numerical range may be replaced with an upper limit value or a lower limit value in another numerical range described in a stepwise manner or a value described in an example.

In the present disclosure, the term "step" denotes not only an individual step but also a step which is not clearly distinguishable from another step as long as an effect expected from the step can be achieved.

In the present disclosure, a combination of preferred aspects is a more preferred embodiment.

Each element in each of the drawings shown in the present disclosure is not necessarily to an exact scale, with a focus on clearly showing the principles of the present disclosure and some emphasis.

In the present disclosure, the term "liquid-repellent layer" refers to a layer having a contact angle with water of 60° or more. The contact angle with water is a value measured under the condition of 25° C. by using a contact angle meter, for example, a fully automatic contact angle meter (product name "DM-701", manufactured by Kyowa Interface Science Co., Ltd.).

In the present disclosure, the term "internal flow passage" means a path through which a liquid passes, which is formed inside the liquid jetting structure. That is, the term "internal flow passage" is a concept including a nozzle formed on a nozzle substrate and a liquid flow passage formed on a flow passage substrate.

In the present disclosure, the term "jetting surface" means a surface of the nozzle substrate on a side where the liquid is jetted in the liquid jetting structure.

In the present disclosure, the term "inner wall of the liquid flow passage" means a surface of the flow passage substrate on a side where the liquid flow passage is formed. In addition, the "inner wall of the nozzle" means a surface of the nozzle substrate on a side where the nozzle is formed.

[Liquid Jetting Structure]

A liquid jetting structure of the present disclosure comprises a nozzle substrate on which a nozzle for jetting a liquid is formed; and a flow passage substrate on which a liquid flow passage communicating with the nozzle is formed. A first layer, a second layer, and a liquid-repellent layer are provided in this order on a jetting surface of the nozzle substrate, and the first layer and the second layer are provided in this order on an inner wall of the liquid flow passage. The first layer is a layer containing at least one selected from the group consisting of tantalum oxide, zirconium oxide, titanium oxide, and hafnium oxide. The second layer is a layer containing at least one selected from the group consisting of $SiO_2$, SiC, SiN, SiCN, and SiON.

Providing the first layer, the second layer, and the liquid-repellent layer in this order on the jetting surface of the nozzle substrate means that the liquid-repellent layer is located on an outermost surface of the nozzle substrate. That is, the liquid-repellent layer is the outermost layer among a plurality of layers provided on the nozzle substrate. Since the liquid jetting structure of the present disclosure has the liquid-repellent layer on the outermost surface of the nozzle substrate, the liquid jetting structure is excellent in antifouling property on the jetting surface.

The liquid jetting structure of the present disclosure has a second layer which is a layer containing at least one selected from the group consisting of $SiO_2$, SiC, SiN, SiCN, and SiON under the liquid-repellent layer which is the outermost layer in the nozzle substrate. A layer containing at least one selected from the group consisting of $SiO_2$, SiC, SiN, SiCN, and SiON has high adhesiveness to the liquid-repellent layer and excellent wipe resistance of the jetting surface.

The liquid jetting structure of the present disclosure has a first layer which is a layer containing at least one selected from the group consisting of tantalum oxide, zirconium oxide, titanium oxide, and hafnium oxide under the second layer in the nozzle substrate, the nozzle, and the liquid flow passage. At least one selected from the group consisting of tantalum oxide, zirconium oxide, titanium oxide, and hafnium oxide is excellent in alkali resistance. Therefore, in a case where an alkaline liquid permeates into the second layer due to a long period of use, the presence of the first layer makes it possible to maintain the alkali resistance of the jetting surface and the internal flow passage.

Hereinafter, an embodiment of the liquid jetting structure of the present disclosure will be described with reference to the drawings.

FIG. 1 is a cross-sectional view showing an embodiment of the liquid jetting structure of the present disclosure.

As shown in FIG. 1, a liquid jetting structure 100 comprises a nozzle substrate 10 on which a nozzle 30 for jetting a liquid is formed, and a flow passage substrate 20 on which a liquid flow passage 40 communicating with the nozzle 30 is formed. It is preferable that the nozzle substrate 10 and the flow passage substrate 20 are bonded by adhesion or the like.

A type of the liquid supplied to the liquid jetting structure 100 is not particularly limited. The liquid jetting structure 100 is used for a liquid jetting head described below, and by incorporating the liquid jetting head into a liquid jetting device described below, fine liquid droplets can be jetted from the nozzle 30. It is preferable to use ink as a liquid, and an image can be recorded by jetting fine ink droplets onto the substrate.

The ink for recording an image is, for example, a liquid containing a coloring material, a solvent, and a surfactant. In addition, a pretreatment liquid may be jetted onto the substrate in advance before the ink is jetted onto the substrate, or a posttreatment liquid may be jetted after the ink is jetted. Therefore, examples of the liquid supplied to the liquid jetting structure 100 include a pretreatment liquid and a posttreatment liquid in addition to the ink. The pretreatment liquid and the posttreatment liquid are usually colorless liquids containing no coloring material.

In addition, the liquid supplied to the liquid jetting structure 100 may be an acidic liquid or an alkaline liquid. The liquid jetting structure 100 is suitable for an alkaline liquid because the jetting surface and the inside of the flow passage are excellent in alkali resistance. In particular, the liquid jetting structure 100 is suitable for a liquid having a pH of 8 to 11. The pH is a value measured at 25° C. using a pH meter, for example, a value measured using a product name "handy pH meter" manufactured by Sato Keiryoki Mfg. Co., Ltd.

<Nozzle Substrate>

The nozzle substrate 10 is, for example, a substrate made of silicon, and may be a single crystal silicon substrate or a polycrystal silicon substrate. The nozzle 30 for jetting a liquid is formed on the nozzle substrate 10.

The nozzle 30 is a hole penetrating the nozzle substrate 10, and is formed by, for example, dry etching. It is preferable that a plurality of the nozzles 30 are formed on the nozzle substrate 10. A shape of the nozzle 30 is not particularly limited, but from the viewpoint of controlling a jetting direction of the liquid, it is preferable that the nozzle 30 has a tapered shape whose diameter decreases toward the jetting direction of the liquid. A hole diameter on a side where the liquid of the nozzle 30 is jetted, that is, a hole diameter of a nozzle opening 31 can be appropriately adjusted. In a case where the liquid jetting structure 100 is used for the ink jet head, the hole diameter of the nozzle opening 31 is, for example, 10 to 30 μm.

A thickness of the nozzle substrate 10 corresponds to a length of the nozzle 30, and is preferably 10 μm to 100 μm, and more preferably 20 μm to 60 μm.

Figure 2:
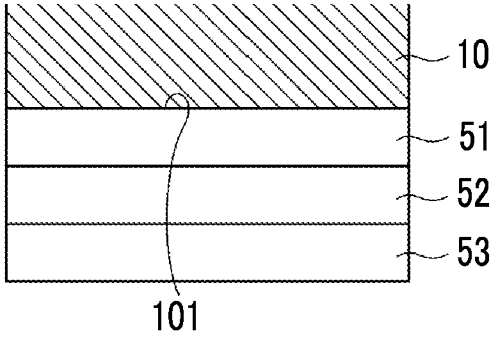
FIG. 2 is an enlarged view of a broken line frame A in FIG. 1.

FIG. 2 is an enlarged view of a broken line frame A in FIG. 1.

As shown in FIG. 2, a first layer 51, a second layer 52, and a liquid-repellent layer 53 are provided in this order on a jetting surface 101 of the nozzle substrate 10.

The first layer 51 is a layer containing at least one selected from the group consisting of tantalum oxide, zirconium oxide, titanium oxide, and hafnium oxide, and is preferably a layer of tantalum oxide, zirconium oxide, or hafnium oxide.

At least one (preferably tantalum oxide, zirconium oxide, or hafnium oxide) selected from the group consisting of tantalum oxide, zirconium oxide, titanium oxide, and hafnium oxide is excellent in alkali resistance. Therefore, in a case where an alkaline liquid permeates into the liquid-repellent layer and the second layer provided on the jetting surface of the nozzle substrate due to a long period of use, the presence of the first layer makes it possible to maintain the alkali resistance of the jetting surface.

A thickness of the first layer 51 is preferably 3 nm to 70 nm, more preferably 10 nm to 50 nm, and still more preferably 20 nm to 50 nm. In a case where the thickness of the first layer 51 is 3 nm or more, the alkaline liquid is less likely to permeate into the first layer 51, and the wipe resistance and the alkali resistance of the jetting surface are excellent. On the other hand, in a case where the thickness of the first layer 51 is 70 nm or less, defects are less likely to occur in the layer, and the wipe resistance and the alkali resistance of the jetting surface are excellent. From the viewpoint of productivity, the thickness of the first layer 51 is preferably 50 nm or less.

The second layer 52 is a layer containing at least one selected from the group consisting of $SiO_2$, SiC, SiN, SiCN, and SiON, and is preferably a $SiO_2$ layer. A layer (preferably $SiO_2$ layer) containing at least one selected from the group consisting of $SiO_2$, SiC, SiN, SiCN, and SiON has high adhesiveness to the liquid-repellent layer 53. Therefore, the alkaline liquid is less likely to permeate into the liquid-repellent layer 53 and the second layer 52, and the wipe resistance and the alkali resistance of the jetting surface are excellent.

A thickness of the second layer 52 is preferably 0.3 nm to 120 nm, more preferably 0.3 nm to 3 nm or 10 nm to 100 nm, still more preferably 0.3 nm to 3 nm, and still more preferably 0.5 nm to 2 nm. In particular, in a case where the thickness of the second layer 52 is 0.3 nm to 3 nm or 10 nm to 100 nm, the adhesiveness between the second layer 52 and the liquid-repellent layer 53 is enhanced, and the wipe resistance and the alkali resistance of the jetting surface are excellent.

A ratio of the thickness of the second layer 52 to the thickness of the first layer 51 is preferably 0.006 or more and 6 or less, more preferably 0.006 or more and 0.3 or less, still more preferably 0.01 or more and 0.15 or less, and still more preferably 0.01 or more and 0.1 or less. In particular, in a case where the ratio of the thickness of the second layer 52 to the thickness of the first layer 51 is 0.006 or more and 0.3 or less, the alkaline liquid is less likely to pemieate into the first layer 51, and the wipe resistance and the alkali resistance of the jetting surface are excellent. In addition, in a case where the ratio of the thickness of the second layer 52 to the thickness of the first layer 51 is 0.01 or more and 0.15 or less, the adhesiveness between the first layer 51 and the second layer 52 is high, and the wipe resistance and the alkali resistance of the jetting surface are excellent.

The liquid-repellent layer 53 is a layer having a contact angle with water of 60° or more. The contact angle of the liquid-repellent layer 53 with water is preferably 70° or more, and more preferably 80° or more. Since the liquid-repellent layer 53 is provided on the outermost surface of the nozzle substrate 10, the wipe resistance of the jetting surface is excellent.

From the viewpoint of exhibiting liquid repellency, the liquid-repellent layer 53 preferably contains a fluorine-containing compound, and more preferably contains a compound having a perfluoropolyether structure. A compound having a perfluoropolyether structure has a highly flexible and dense molecular structure. Therefore, it is possible to suppress the permeation of the alkaline liquid into the inside of the liquid-repellent layer 53, and the alkali resistance is excellent. Since the perfluoropolyether structure has a high fluorine content, fluorine atoms are likely to remain on a surface of the liquid-repellent layer 53 even after wiping, and the contact angle is less likely to decrease. That is, the wipe resistance of the jetting surface is excellent.

From the viewpoint of adhesiveness to the second layer 52 which is a layer containing at least one selected from the group consisting of $SiO_2$, SiC, SiN, SiCN, and SiON, the liquid-repellent layer 53 is preferably formed using silicon coupling agent, and more preferably formed using a silicon coupling agent having a perfluoropolyether structure. That is, the liquid-repellent layer 53 is still more preferably a silicon compound having a perfluoropolyether structure.

Examples of the perfluoropolyether structure include structures represented by Formulas 1 to 3. Among these, the perfluoropolyether structure is preferably a structure represented by Formula 1.

$$CF_3O—(CF_2O)_n—(CF_2CF_2O)_m—* \quad (1)$$

In Formula 1, m represents an integer of 0 to 200, n represents an integer of 0 to 300, and m+n is 1 or more. * indicates a bonding position to other structures in the compound.

In Formula 1, m represents preferably an integer of 0 to 50 and more preferably an integer of 1 to 50. n represents preferably an integer of 0 to 50 and more preferably an integer of 1 to 50.

$$CF_3—(CF_2OCF_2O)_n—* \quad (2)$$

In Formula 2, n represents an integer of 1 to 100. * indicates a bonding position to other structures in the compound.

$$CF_3—(CF_2O)_n—* \quad (3)$$

In Formula 3, n represents an integer of 1 to 300. * indicates a bonding position to other structures in the compound.

A thickness of the liquid-repellent layer 53 is preferably 3 nm to 12 nm, and more preferably 3 nm to 8 nm. In a case where the thickness of the liquid-repellent layer 53 is 3 nm or more, the wipe resistance is improved. On the other hand, in a case where the thickness of the liquid-repellent layer 53 is 12 nm or less, aggregates derived from components constituting the liquid-repellent layer 53 are less likely to adhere to the surface of the liquid-repellent layer 53, and insertion of the aggregates into the nozzle 30 can be suppressed. As a result, the deterioration of the liquid jettability is suppressed.

Figure 3:
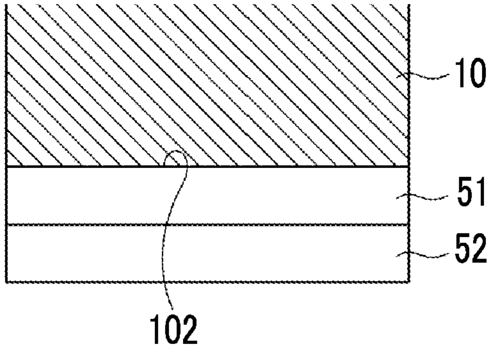
FIG. 3 is an enlarged view of a broken line frame B in FIG. 1.

FIG. 3 is an enlarged view of a broken line frame B in FIG. 1.

As shown in FIG. 3, the liquid jetting structure 100 has a first layer 51 and a second layer 52 on an inner wall 102 of the nozzle 30 in this order. The first layer 51 and the second layer 52 provided on the inner wall 102 of the nozzle 30 are the same as the first layer 51 and the second layer 52 provided on the jetting surface 101 of the nozzle substrate 10.

Since the liquid jetting structure 100 has the first layer 51 and the second layer 52 on the inner wall 102 of the nozzle 30 in this order, the inner wall 102 of the nozzle 30 has excellent alkali resistance.

<FLow Passage Substrate>

The flow passage substrate 20 is, for example, a substrate made of silicon, and may be a single crystal silicon substrate or a polycrystal silicon substrate. As shown in FIG. 1, the flow passage substrate 20 is composed of a wall member 21 and a lid member 22, and the wall member 21 and the lid member 22 are preferably bonded by adhesion or the like. The liquid flow passage 40 communicating with the nozzle 30 is formed in the flow passage substrate 20. The liquid flow passage 40 includes a nozzle communication path 41, a pressure chamber 42, and a liquid supply path 43.

The nozzle communication path 41 is a flow passage connecting the pressure chamber 42 and the nozzle 30. The nozzle communication path 41 is preferably linear in a cross section.

The pressure chamber 42 is a flow passage whose volume changes by application of a driving voltage in a case where the liquid jetting structure 100 is used for a liquid jetting head described below. A planar shape of the pressure chamber 42 is, for example, a substantially square shape in a case where the liquid jetting structure 100 is viewed in a plan view, and has an outlet of the liquid to the nozzle communication path 41 at one of both corner portions on the diagonal line and the liquid supply path 43 as an inlet of the liquid at the other. The planar shape of the pressure chamber 42 is not limited to a substantially square shape, and may be a rectangle, a trapezoid, or the like.

The liquid supply path 43 is a flow passage that is connected to a liquid tank (not shown) in a case where the liquid jetting structure 100 is incorporated into a liquid jetting device described below. A liquid is supplied from the liquid tank to the pressure chamber 42 via the liquid supply path 43. The arrows in the figure indicate a direction in which the liquid flows.

The liquid jetting structure 100 has a first layer 51 and a second layer 52 on an inner wall 201 of the liquid flow passage 40 in this order, as on the inner wall 102 of the nozzle 30 shown in FIG. 3. The first layer 51 and the second layer 52 provided on the inner wall 201 of the liquid flow passage 40 are the same as the first layer 51 and the second layer 52 provided on the jetting surface 101 of the nozzle substrate 10. Specifically, the inner wall 201 of the liquid flow passage 40 has a surface of the wall member 21 on a side where the liquid flow passage 40 is formed, a surface of the lid member 22 on a side where the liquid flow passage 40 is formed, and a surface of the nozzle substrate 10 on a side where the liquid flow passage 40 is foinied.

Since the liquid jetting structure 100 has the first layer 51 and the second layer 52 on the inner wall 201 of the liquid flow passage 40 in this order, the inner wall 201 of the liquid flow passage 40 has excellent alkali resistance.

Figure 4:
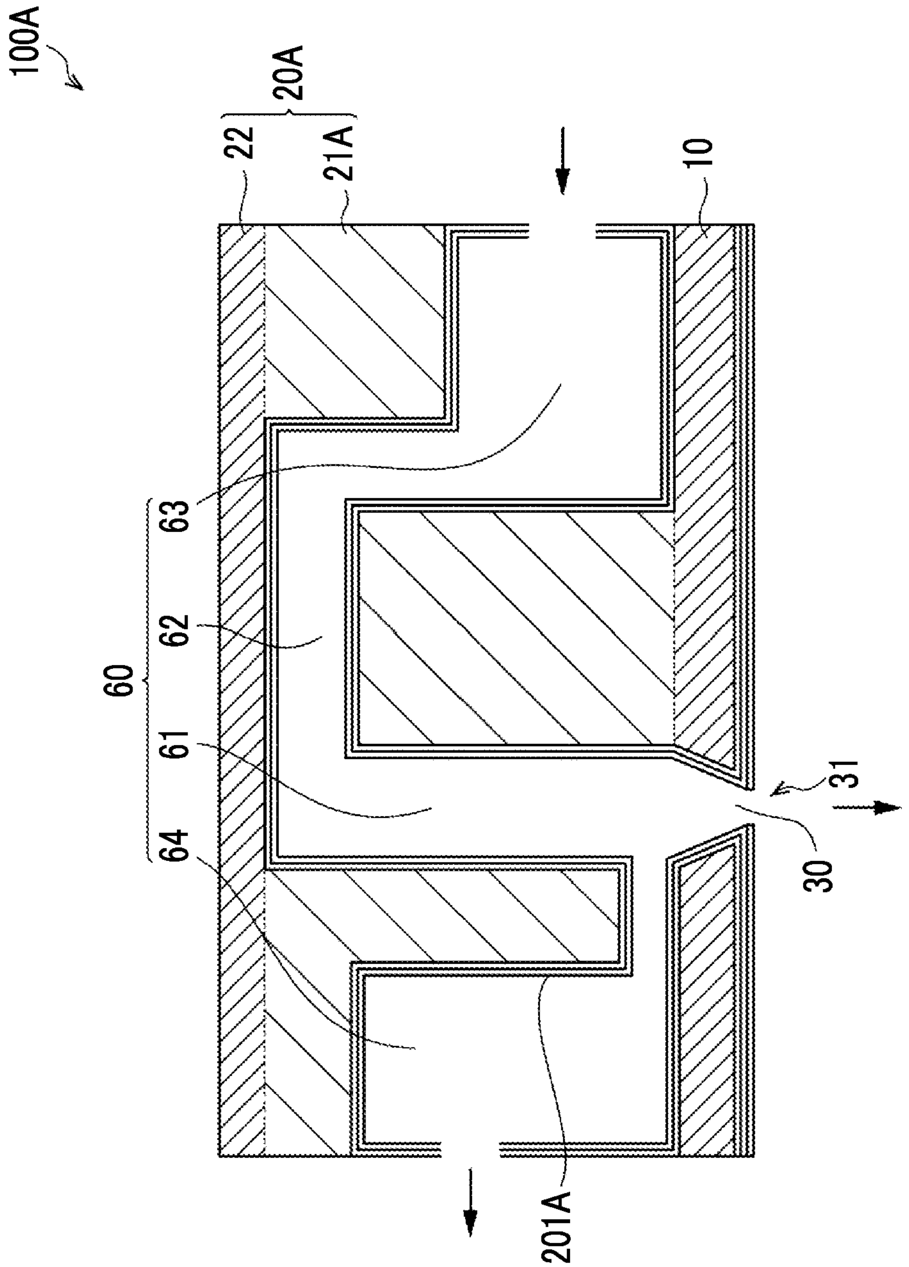
FIG. 4 is a schematic cross-sectional view showing a modification example of the liquid jetting structure of the present disclosure.

In addition to the structure shown in FIG. 1, the structure of the flow passage substrate 20 may be, for example, the structure shown in FIG. 4.

FIG. 4 is a schematic cross-sectional view showing a modification example of the liquid jetting structure of the present disclosure.

As shown in FIG. 4, a liquid jetting structure 100A comprises a nozzle substrate 10, and a flow passage substrate 20A on which a liquid flow passage 60 communicating with the nozzle 30 is formed. The configuration of the nozzle substrate 10 is as described above. The liquid flow passage 60 includes a nozzle communication path 61, a pressure chamber 62, a liquid supply path 63, and a circulation flow passage 64.

The nozzle communication path 61 is the same as the nozzle communication path 41 described above, and is a flow passage connecting the pressure chamber 62 and the nozzle 30.

The pressure chamber 62 is the same as the pressure chamber 42 described above, and is a flow passage whose volume changes by application of a driving voltage in a case where the liquid jetting structure 100A is used for a liquid jetting head described below.

The liquid supply path 63 is the same as the liquid supply path 43 described above, and is a flow passage that is connected to a liquid tank (not shown) in a case where the liquid jetting structure 100A is incorporated into a liquid jetting device described below. A liquid is supplied from the liquid tank to the pressure chamber 62 via the liquid supply path 63.

The circulation flow passage 64 is a flow passage that is connected to a liquid tank (not shown) in a case where the liquid jetting structure 100A is incorporated into a liquid jetting device described below. Although the liquid is sent to the nozzle 30 through the liquid supply path 63, the pressure chamber 62, and the nozzle communication path 61, the liquid not jetted from the nozzle opening 31 of the nozzle 30 is collected in the liquid tank through the circulation flow passage 64.

The liquid jetting structure 100A has a first layer 51 and a second layer 52 on an inner wall 201A of the liquid flow passage 60 in this order, as on the inner wall 201 of the liquid flow passage 40. The first layer 51 and the second layer 52 provided on the inner wall 201A of the liquid flow passage 60 are the same as the first layer 51 and the second layer 52 provided on the inner wall 201 of the liquid flow passage 40.

In the liquid jetting structure of the present disclosure, as shown in FIGS. 1 and 4, it is preferable that the first layer 51 and the second layer 52 are provided on the inner wall 102 of the nozzle 30. That is, it is preferable that the liquid jetting structure of the present disclosure comprises: a nozzle substrate on which a nozzle for jetting a liquid is formed; and a flow passage substrate on which a liquid flow passage communicating with the nozzle is formed, in which a first layer, a second layer, and a liquid-repellent layer are provided in this order on a jetting surface of the nozzle substrate, the first layer and the second layer are provided in this order on an inner wall of the nozzle and an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON.

In both the liquid jetting structure 100 and the liquid jetting structure 100A, the first layer 51 and the second layer 52 are provided on the inner wall 102 of the nozzle 30. However, the first layer 51 and the second layer 52may not be provided on the inner wall 102 of the nozzle 30. Usually, an area of the inner wall 102 of the nozzle 30 is very small with respect to an area of the inner wall 201 of the liquid flow passage 40 (inner wall 201A of the liquid flow passage 60). Therefore, even though the first layer 51 and the second layer 52 are not provided on the inner wall 102 of the nozzle 30, the internal flow passage is excellent in alkali resistance.

<Layer Formation Method>

Next, a method of forming the first layer 51, the second layer 52, and the liquid-repellent layer 53 on the nozzle substrate 10, the nozzle 30, and the flow passage substrate 20 will be described. The first layer 51, the second layer 52, and the liquid-repellent layer 53 are preferably formed after the nozzle substrate 10 and the flow passage substrate 20 are bonded to obtain a bonded body.

First, it is preferable to perform surface treatment on a surface of the bonded body in advance before forming the first layer 51 on the surface of the bonded body of the nozzle substrate 10 and the flow passage substrate 20. Examples of the surface treatment include UV ozone treatment and oxygen plasma treatment. Among these, the surface treatment is preferably oxygen plasma treatment from the viewpoint of enhancing the adhesiveness between the bonded body and the first layer. The irradiation conditions of the oxygen plasma can be appropriately adjusted, for example, the irradiation is performed under the conditions of an output of 100 W to 200 W, a flow rate of 50 mL/min to 200 mL/min, and an irradiation time of 1 minute to 10 minutes.

Next, the first layer 51 is formed on a surface of the surface-treated bonded body. Specifically, the first layer 51 is formed on the jetting surface 101 of the nozzle substrate 10, and on the inner wall 102 of the nozzle 30 and the inner wall 201 of the liquid flow passage 40.

The first layer 51 is preferably formed by an atomic layer deposition (ALD) method. As the ALD method, a generally known method can be adopted. In a case where the ALD method is used, a dense layer is formed, so that the effect of suppressing the permeation of the alkaline liquid is high.

The first layer 51 can be formed, for example, by repeating four steps of a step of disposing the surface-treated bonded body in an atomic layer deposition (ALD) chamber, introducing $H_2O$ gas, and then introducing precursor gas, a step of discharging surplus gas, a step of introducing $H_2O$ gas, and a step of discharging surplus gas.

First, by introducing $H_2O$ gas, a hydroxyl group is formed on the surface of the bonded body. Next, by introducing precursor gas, the hydroxyl group formed on the surface of the bonded body reacts with a precursor. Further, by introducing $H_2O$ gas, the precursor that has reacted with the hydroxyl group reacts with $H_2O$.

Examples of the precursor used in a case of forming a tantalum oxide layer as the first layer 51 include tert-butylimino tri(diethylamino)tantalum (TBTDET), tert-butylimino tri(dimethylamino)tantalum (TBTDMT), tert-butylimino tri(ethylmethylamino)tantalum (TBTEMT), ethylimino tri(diethylamino)tantalum (EITDET), ethylimino tri(dimethylamino)tantalum (EITDMT), ethylimino tri(ethylmethylamino)tantalum (EITEMT), tert-amylimino tri(dimethylamino)tantalum (TAIMAT), tert-amylimino tri (diethylamino)tantalum, pentakis(dimethylamino)tantalum, and tert-amylimino tri(ethylmethylamino)tantalum.

Examples of the precursor used in a case of forming a zirconium oxide layer as the first layer 51 include tetrakis (N-ethylmethylamino)zirconium (TEMAZ) and tris(dimethylamino)cyclopentadienyl zirconium (ZAC).

Examples of the precursor used in a case of forming a titanium oxide layer as the first layer 51 include tetrakis (dimethylamino)titanium (TDMAT), tetrakis(diethylamino) titanium (TDEAT), and tetrakis(ethylmethylamino)titanium (TEMAT).

Examples of the precursor used in a case of forming a hafnium oxide layer as the first layer 51 include tetrakis (dimethylamino)hafnium (TDMAHf), tetrakis(diethylamino)hafnium (TDEAHf), and tetrakis(ethylmethylamino)hafnium (TEMAHf).

In a case of forming the first layer 51, ozone gas may be used instead of $H_2O$ gas.

Next, the second layer 52 is formeed on the first layer 51. A method of forming the second layer 52 is not particularly limited, and examples thereof include a chemical vapor deposition (CVD) method. As the CVD method, a generally known method can be adopted. It is more preferable that the second layer 52 is fanned by an atomic layer deposition (ALD) method. As the ALD method, a generally known method can be adopted. In a case where the ALD method is used, a dense layer is formed, so that the effect of suppressing the permeation of the alkaline liquid is high.

Next, the liquid-repellent layer 53 is formedon the second layer 52.

Although a method of fonning the liquid-repellent layer 53 is not particularly limited, a method of performing hydrophilization treatment on the surface of the second layer 52 and then forming a film by a vapor deposition method using a silane coupling agent is preferable. Since the silane coupling agent is bonded to a hydrophilic group formed on the surface of the second layer after hydrolysis, the adhesiveness between the liquid-repellent layer 53 and the second layer 52 is high, and the permeation of the alkaline liquid is suppressed.

Examples of the hydrophilization treatment include UV ozone treatment and oxygen plasma treatment. Among these, the hydrophilization treatment is preferably oxygen plasma treatment. The irradiation conditions can be appropriately adjusted, for example, the irradiation is perfoinied under the conditions of an output of 100 W to 200 W, a flow rate of 50 mL/min to 200 mL/min, and an irradiation time of 1 minute to 10 minutes.

The film formation method by the vapor deposition method can be performed, for example, by disposing a bonded body in which the first layer 51 and the second layer 52 are laminated in a vacuum chamber and putting a silane coupling agent in a vapor deposition boat. A vapor deposition temperature is preferably 100° C. to 300° C.

The silane coupling agent is preferably a fluorine-containing silane coupling agent, more preferably a silane coupling agent having a perfluoropolyether structure, and still more preferably an alkoxysilane having a perfluoropolyether structure. Examples of the perfluoropolyether structure include structures represented by Formulas 1 to 3. The preferred embodiment is as described above.

The silane coupling agent may be a commercially available product, and examples of the preferred silane coupling agent include the following commercially available products. Examples of the silane coupling agent having a structure represented by Formula 1, in which m represents an integer of 1 to 50 and n represents an integer of 1 to 50 in Formula 1, include KY1901, KY1903, and KY1903-1 manufactured by Shin-Etsu Chemical Co., Ltd. Examples of the silane coupling agent having a structure represented by Formula 2, in which n represents an integer of 1 to 100 in Formula 2, include X-71-195 manufactured by Shin-Etsu Chemical Co., Ltd. Examples of the silane coupling agent having a structure represented by Formula 3, in which n represents an integer of 1 to 300 in Formula 3, include OPTOOL DSX manufactured by Daikin Industries, Ltd.

In order to further improve the adhesiveness between the second layer 52 and the liquid-repellent layer 53, it is preferable that the bonded body in which the first layer 51, the second layer 52, and the liquid-repellent layer 53 are laminated is held in a high-temperature and high-humidity environment after film formation. For example, the bonded body in which the first layer 51, the second layer 52, and the liquid-repellent layer 53 are laminated is held at a temperature of 50° C. to 90° C. and a humidity of 50% to 90% for 6 hours to 24 hours.

Next, the liquid-repellent layer 53 provided on the inner wall 102 of the nozzle 30 and the inner wall 201 of the liquid flow passage 40 is removed.

For example, a tape is attached to the surface of the liquid-repellent layer 53 provided on the jetting surface of the nozzle substrate 10, and oxygen plasma treatment is performed on the nozzle 30 and the liquid flow passage 40, whereby the liquid-repellent layer 53 provided on the inner wall 102 of the nozzle 30 and the inner wall 201 of the liquid flow passage 40 can be removed.

[Liquid Jetting Head]

The liquid jetting head of the present disclosure comprises a liquid jetting structure. The liquid jetting head of the present disclosure will be described with reference to FIG. 5.

Figure 5:
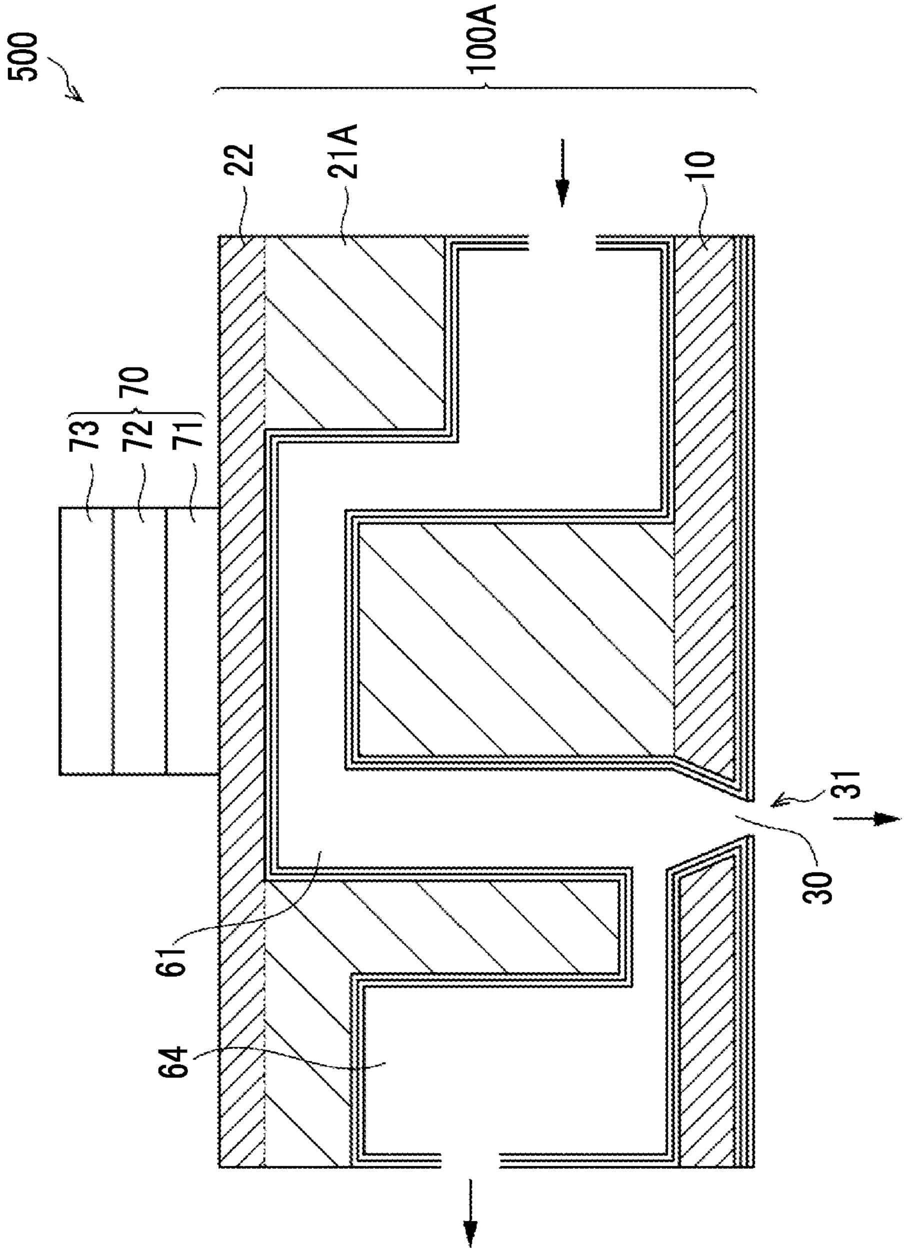
FIG. 5 is a schematic cross-sectional view showing an embodiment of a liquid jetting head of the present disclosure.

FIG. 5 is a cross-sectional view showing an embodiment of the liquid jetting head of the present disclosure.

As shown in FIG. 5, a liquid jetting head 500 comprises a liquid jetting structure 100A and a piezoelectric element 70.

The configuration of the liquid jetting structure 100A is as described above. The lid member 22 in the liquid jetting structure 100A functions as a diaphragm in the liquid jetting head 500.

On the lid member (diaphragm) 22, the piezoelectric element 70 having a laminated structure of a lower electrode 71, a piezoelectric layer 72, and an upper electrode 73 is arranged. The piezoelectric element 70 is provided above the pressure chamber 62.

The upper electrode 73 is an individual electrode patterned corresponding to a shape of the pressure chamber 62. In a case where a driving voltage is applied to the upper electrode 73 of the piezoelectric element 70 provided above the pressure chamber 62 according to input data, the piezoelectric element 70 and the lid member (diaphragm) 22 are deformed and the volume of the pressure chamber 62 is changed. Because of the pressure change in the pressure chamber 62, a liquid is jetted from the nozzle opening 31 of the nozzle 30 via the nozzle communication path 61.

A heater may be provided inside the pressure chamber 62 as a pressure generating element instead of the piezoelectric element, a driving voltage may be supplied to the heater to generate heat, and the liquid in the pressure chamber 62 may be jetted from the nozzle opening 31 by utilizing the film boiling phenomenon.

[Liquid Jetting Device]

The liquid jetting device of the present disclosure comprises a liquid jetting head. Hereinafter, an ink jet recording device, which is an example of the liquid jetting device, will be described.

The ink jet recording device comprises, for example, a plurality of ink jet heads (an example of a liquid jetting head) provided for each ink color, an ink storage unit that stores ink to be supplied to each ink jet head, a paper feed unit that supplies recording paper, a decurling unit that removes curl of the recording paper, a transport unit that is disposed facing a jetting surface of each ink jet head and transports the recording paper, an image detection unit that reads an image recording result, and a paper discharge unit that discharges an image-recorded object to the outside.

Each configuration of the ink jet recording device other than the ink jet head is the same as that of the known configuration in the related art, and for example, WO2017/073526A can be referred to.

The liquid jetting device of the present disclosure preferably has a liquid circulation mechanism that circulates a liquid between the liquid jetting head and the liquid tank. For example, by using the liquid jetting head comprising the liquid jetting structure 100A shown in FIG. 4, a liquid can be circulated between the liquid jetting head and the liquid tank.

EXAMPLES

Hereinafter, examples of the present disclosure will be described, but the present disclosure is not limited to the following examples.

Example 1

<Formation of First Layer>

A nozzle substrate on which a nozzle was formed and a flow passage substrate on which a liquid flow passage was formed were bonded to prepare a bonded body having the same structure as in FIG. 4 and having a size of 25 m×35 mm.

Step (a1): Surface Treatment

The bonded body was disposed in a vacuum chamber. After evacuating the inside of the vacuum chamber, it was replaced with oxygen to generate oxygen plasma. The irradiation conditions of the oxygen plasma were an output of 100 W, a flow rate of 100 mL/min, and an irradiation time of 1 minute.

Step (b1): Formation of Tantalum Oxide Layer

Next, the bonded body after the step (a1) was disposed in an atomic layer deposition (ALD) chamber, and $H_2O$ gas was introduced to form a hydroxyl group on a surface of the bonded body. Next, tert-butylimino tri(ethylmethylamino) tantalum (TBTEMT) gas was introduced, and the hydroxyl group formed on the surface of the bonded body was reacted with TBTEMT. After that, surplus gas was discharged. Next, $H_2O$ gas was introduced to react TBTEMT bonded to the hydroxyl group in the previous reaction with $H_2O$. After that, surplus gas was discharged. Then, the introduction and discharge of TBTEMT gas and the introduction and discharge of $H_2O$ gas were repeated as one cycle until a predetermined thickness (15 nm) was reached, thereby forming a tantalum oxide layer.

<Formation of Second Layer>

Step (c1): Film Formation of Silicon Oxide Next, a $SiO_2$ layer was formed on the bonded body after the step (b1) by chemical vapor deposition (CVD). A film was formed at a substrate temperature of 100° C. by using $SiCl_4$ as a raw material. A thickness of the $SiO_2$ layer was 30 nm.

<Formation of Liquid-Repellent Layer>

Step (d1): Hydrophilization Treatment

Next, the bonded body after the step (c1) was disposed in a vacuum chamber. After evacuating the inside of the vacuum chamber, it was replaced with oxygen to generate oxygen plasma. The irradiation conditions of the oxygen plasma were an output of 100 W, a flow rate of 100 mL/min, and an irradiation time of 1 minute.

Step (e1): Vapor Deposition of Silane Coupling Agent

Next, the bonded body after the step (d1) was disposed in a vapor deposition machine chamber. A silane coupling agent was added to a tungsten boat. As the silane coupling agent, KY1901 (a silane coupling agent having a perfluoropolyether structure represented by Formula 1, manufactured by Shin-Etsu Chemical Co., Ltd.) was used.

$$CF_3O—(CF_2O)_n—(CF_2CF_2O)_m—* \quad (1)$$

In Formula 1, m represents an integer of 1 to 50, n represents an integer of 1 to 50. * indicates a bonding position to other structures in the compound.

A shutter was opened in a case where a temperature of the tungsten boat reached 180° C., and, while monitoring a film thickness with a crystal oscillator, the shutter was closed in a case where the film thickness reached 5 nm, and the silane coupling agent was vapor-deposited.

Step (f1): Storage in High-Temperature and High-Humidity Environment

Next, in order to promote the hydrolysis reaction of the silane coupling agent and the condensation reaction between the bonded body and the silane coupling agent after the step (e1), the mixture was left for 12 hours in an environment of a temperature of 60° C. and a humidity of 90%. A contact angle of the formed liquid-repellent layer with water was 90° or more. The contact angle with water was measured under the condition of 25° C. by using a fully automatic contact angle meter (product name "DM-701", manufactured by Kyowa Interface Science Co., Ltd.).

Step (g1): Removal of Liquid-Repellent Layer Formed on Inner Wall of Nozzle and Inner Wall of Liquid Flow Passage Next, a tape was attached to a surface of the nozzle substrate in the bonded body after the step (f1), and oxygen plasma treatment was performed on the nozzle and the liquid flow passage from a surface of the flow passage substrate opposite to a surface bonded to the nozzle substrate. As a result, the liquid-repellent layer formed on the inner wall of the nozzle and the inner wall of the liquid flow passage was removed, thereby obtaining a liquid jetting structure.

Example 2

A liquid jetting structure was obtained in the same manner as in the steps (a1) and (c1) to (g1) of Example 1 except that the step (b1) of Example 1 was changed to the following step (b2).

Step (b2): Formation of Zirconium Oxide Layer

A zirconium oxide layer was formed in the same manner as in the step (b 1) except that TBTEMT in the step (b1) was changed to tris(dimethylamino)cyclopentadienyl zirconium (ZAC).

Example 3

A liquid jetting structure was obtained in the same manner as in the steps (a1) and (c1) to (g1) of Example 1 except that the step (b1) of Example 1 was changed to the following step (b3).

Step (b3): Fonnation of Titanium Oxide Layer

A titanium oxide layer was formed in the same manner as in the step (b 1) except that TBTEMT in the step (b1) was changed to tetrakis(dimethylamino)titanium (TDMAT).

Example 4

A liquid jetting structure was obtained in the same manner as in the steps (a1) and (c1) to (g1) of Example 1 except that the step (b1) of Example 1 was changed to the following step (b4).

Step (b4): Formation of Hafnium Oxide Layer

A hafnium oxide layer was formed in the same manner as in the step (b 1) except that TBTEMT in the step (b1) was changed to tetrakis(dimethylamino)hafnium (TDMAHf).

Example 5

A liquid jetting structure was obtained in the same manner as in the steps (a1) to (d1), (f1), and (g1) of Example 1 except that the step (e1) of Example 1 was changed to the following step (e2).

Step (e2): Vapor Deposition of Silane Coupling Agent

The silane coupling agent was vapor-deposited in the same manner as in the step (e1) except that the film thickness by the vapor deposition of the silane coupling agent was changed from 5 nm to 10 nm in the step (e1).

Example 6

A liquid jetting structure was obtained in the same manner as in the steps (a 1), (b 1), and (d1) to (g1) of Example 1 except that the step (c1) of Example 1 was changed to the following step (c2).

Step (c2): Formation of SiN layer

A SiN layer was formed on the bonded body after the step (b1) by chemical vapor deposition (CVD). Monosilane ($SiH_4$), ammonia, and nitrogen were used as raw materials, and a film was formed at a substrate temperature of 350° C. A thickness of the SiN layer was 30 nm.

Example 7

A liquid jetting structure was obtained in the same manner as in the steps (a1) and (c1) to (g1) of Example 1 except that the step (b1) of Example 1 was changed to the following step (b5).

Step (b5): Formation of Tantalum Oxide Layer

A tantalum oxide layer was formed in the same manner as in the step (b 1) except that the thickness was changed to 5 nm.

Example 8

A liquid jetting structure was obtained in the same manner as in the steps (a1) and (c1) to (g1) of Example 1 except that the step (b1) of Example 1 was changed to the following step (b6).

Step (b6): Formation of Tantalum Oxide Layer

A tantalum oxide layer was formed in the same manner as in the step (b 1) except that the thickness was changed to 60 nm.

Example 9

A liquid jetting structure was obtained in the same manner as in the steps (a1), (b1), and (d1) to (g1) of Example 1 except that the step (c1) of Example 1 was changed to the following step (c3).

Step (c3): Formation of $SiO_2$ layer

An $SiO_2$ layer was formed in the same manner as in the step (c1) except that the thickness was changed to 5 nm.

Example 10

A liquid jetting structure was obtained in the same manner as in the steps (a1) and (d1) to (g1) of Example 1 except that the step (b1) of Example 1 was changed to the following step (b7) and the step (c1) was changed to the following step (c4).

Step (b7): Formation of Tantalum Oxide Layer

A tantalum oxide layer was formed in the same manner as in the step (b 1) except that the thickness was changed to 30 nm.

Step (c4): Formation of $SiO_2$ Layer

An $SiO_2$ layer was formned in the same manner as in the step (c1) except that the thickness was changed to 15 nm.

Example 11

A liquid jetting structure was obtained in the same manner as in the steps (a1) to (d1) and (g1) of Example 1 except that the step (e1) of Example 1 was changed to the following step (e3) and the step (f1) was changed to the following step (f2).

Step (e3): Vapor Deposition of Silane Coupling Agent

The silane coupling agent was vapor-deposited in the same manner as in the step (e1) except that KY 1901 in the step (e1) was changed to trichloro(1H, 1H, 2H, 2H-heptadecafluorodecyl)silane (FDTS).

Step (f1): Storage in High-Temperature and High-Humidity Environment

In order to promote the hydrolysis reaction of the silane coupling agent and the condensation reaction between the bonded body and the silane coupling agent after the step (e3), the mixture was left for 4 hours in an environment of a temperature of 150° C. A contact angle of the formed liquid-repellent layer with water was 90° or more.

Comparative Example 1

After the step (a1), the step (c1) was carried out, and then the step (b1) was carried out. Further, the steps (d1) to (g1) were carried out in the same manner as in Example 1 to obtain a liquid jetting structure.

Comparative Example 2

After the step (a1), the step (b1) was carried out. Next, the following step (j1) was carried out. Further, the steps (d1) to (g1) were carried out in the same manner as in Example 1 to obtain a liquid jetting structure.

Step (j1): Formation of Plasma Polymerization Film

A silicone polymer was plasma-polymerized on the bonded body after the step (b1) with reference to Examples of JP2008-105231A to form a plasma polymerization film. A thickness of the plasma polymerization film was 30 nm.

Comparative Example 3

After the step (a1) was carried out, the following step (k1) was carried out. Further, the steps (c1) to (g1) were carried out in the same manner as in Example 1 to obtain a liquid jetting structure.

Step (k1): Formation of Tantalum Oxide Layer

A tantalum oxide layer was formed on the bonded body after the step (a1) by a sputtering method. The tantalum oxide layer was formed only on the surface of the nozzle substrate, not on the inner wall of the nozzle and the inner wall of the liquid flow passage. A thickness of the tantalum oxide layer was 15 nm.

Comparative Example 4

After the step (a1) was carried out, the steps (c1) to (g1) were carried out in the same manner as in Example 1 to obtain a liquid jetting structure. That is, the step (b1) was not carried out.

Comparative Example 5

After the step (a1) and the step (b 1) were carried out, the steps (d1) to (g1) were carried out in the same manner as in Example 1 to obtain a liquid jetting structure. That is, the step (c1) was not carried out.

Next, the wipe resistance and the alkali resistance of the surface of the nozzle substrate, the alkali resistance of the internal flow passage, and the jettability were evaluated. The evaluation method is as follows.

Example 1A

<Formation of First Layer>

A nozzle substrate on which a nozzle was formed and a flow passage substrate on which a liquid flow passage was formed were bonded to prepare a bonded body having the same structure as in FIG. 4 and having a size of 25 m×35 mm.

Step (p1): Surface Treatment

The bonded body was disposed in a vacuum chamber. After evacuating the inside of the vacuum chamber, it was replaced with oxygen to generate oxygen plasma. The irradiation conditions of the oxygen plasma were an output of 30 W, a flow rate of 100 mL/min, and an irradiation time of 30 minutes.

Step (q1): Formation of Hafnium Oxide Layer

Next, the bonded body after the step (p1) was disposed in an atomic layer deposition (ALD) chamber, and $H_2O$ gas was introduced to form a hydroxyl group on a surface of the bonded body. Next, tetrakis(dimethylamino)hafnium (TDMAHf) gas was introduced, and a hydroxyl group formed on the surface of the bonded body was reacted with TDMAHf. After that, surplus gas was discharged. Next, $H_2O$ gas was introduced to react TDMAHf bonded to the hydroxyl group in the previous reaction with $H_2O$. After that, surplus gas was discharged. Then, the introduction and discharge of TDMAHf gas and the introduction and discharge of $H_2O$ gas were repeated as one cycle until a predetermined thickness (30 nm) was reached, thereby forming a hafnium oxide layer.

<Formation of Second Layer>

Step (r1): Film Formation of Silicon Oxide

Next, the bonded body after the step (q1) was disposed in an atomic layer deposition (ALD) chamber, and $H_2O$ gas was introduced to form a hydroxyl group on a surface of the bonded body. Next, tris(dimethylamino)silane (TDMAS) gas was introduced, and a hydroxyl group formed on the surface of the bonded body was reacted with TDMAS. After that, surplus gas was discharged. Next, $H_2O$ gas was introduced to react TDMAS bonded to the hydroxyl group in the previous reaction with $H_2O$. After that, surplus gas was discharged. Then, the introduction and discharge of TDMAS gas and the introduction and discharge of $H_2O$ gas were repeated as one cycle until a predetermined thickness (1 nm) was reached, thereby forming a silicon oxide layer.

<Formation of Liquid-Repellent Layer>

Step (s1): Hydrophilization Treatment

Next, the bonded body after the step (r1) was disposed in a vacuum chamber. After evacuating the inside of the vacuum chamber, it was replaced with oxygen to generate oxygen plasma. The irradiation conditions of the oxygen plasma were an output of 30 W, a flow rate of 100 mL/min, and an irradiation time of 30 minutes.

Step (t1): Vapor Deposition of Silane Coupling Agent

Next, the bonded body after the step (s1) was disposed in a vapor deposition machine chamber. A silane coupling agent was added to a tungsten boat. As the silane coupling agent, KY1901 (a silane coupling agent having a perfluoropolyether structure represented by Formula 1, manufactured by Shin-Etsu Chemical Co., Ltd.) was used.

$$CF_3O—(CF_2O)_n—(CF_2CF_2O)_m—* \quad (1)$$

In Formula 1, m represents an integer of 1 to 50, n represents an integer of 1 to 50. * indicates a bonding position to other structures in the compound.

A shutter was opened in a case where a temperature of the tungsten boat reached 180° C., and, while monitoring a film thickness with a crystal oscillator, the shutter was closed in a case where the film thickness reached 5 nm, and the silane coupling agent was vapor-deposited.

Step (u1): Storage in High-Temperature and High-Humidity Environment

Next, in order to promote the hydrolysis reaction of the silane coupling agent and the condensation reaction between the bonded body and the silane coupling agent after the step (t1), the mixture was left for 12 hours in an environment of a temperature of 60° C. and a humidity of 60%. A contact angle of the formed liquid-repellent layer with water was 90° or more. The contact angle with water was measured under the condition of 25° C. by using a fully automatic contact angle meter (product name "DM-701", manufactured by Kyowa Interface Science Co., Ltd.).

Step (v1): Removal of Liquid-Repellent Layer Formed on Inner Wall of Nozzle and Inner Wall of Liquid Flow Passage Next, a tape was attached to a surface of the nozzle substrate in the bonded body after the step (u1), and oxygen plasma treatment was performed on the nozzle and the liquid flow passage from a surface of the flow passage substrate opposite to a surface bonded to the nozzle substrate. As a result, the liquid-repellent layer formed on the inner wall of the nozzle and the inner wall of the liquid flow passage was removed, thereby obtaining a liquid jetting structure.

Example 2A

A liquid jetting structure was obtained in the same manner as in the steps (p1) and (r1) to (v1) of Example 1A except that the step (q1) of Example 1A was changed to the following step (q2).

Step (q2): Formation of Hafnium Oxide Layer

Next, the bonded body after the step (p1) was disposed in an atomic layer deposition (ALD) chamber, and $H_2O$ gas was introduced to form a hydroxyl group on a surface of the bonded body. Next, tetrakis(dimethylamino)hafnium (TDMAHf) gas was introduced, and a hydroxyl group formed on the surface of the bonded body was reacted with TDMAHf. After that, surplus gas was discharged. Next, $H_2O$ gas was introduced to react TDMAHf bonded to the hydroxyl group in the previous reaction with $H_2O$. After that, surplus gas was discharged. Then, the introduction and discharge of TDMAHf gas and the introduction and discharge of $H_2O$ gas were repeated as one cycle until a predetermined thickness (15 nm) was reached, thereby forming a hafnium oxide layer.

Example 3A

A liquid jetting structure was obtained in the same manner as in the steps (p1) and (r1) to (v1) of Example 1A except that the step (q1) of Example 1A was changed to the following step (q3).

Step (q3): Formation of Zirconium Oxide Layer

A zirconium oxide layer was formed in the same manner as in the step (q 1) except that TDMAHf in the step (q1) was changed to tris(dimethylamino)cyclopentadienyl zirconium (ZAC).

Example 4A

A liquid jetting structure was obtained in the same manner as in the steps (p1) and (r1) to (v1) of Example 1A except that the step (q1) of Example 1A was changed to the following step (q4).

Step (q4): Formation of Tantalum Oxide Layer

A tantalum oxide layer was formed in the same manner as in the step (q1) except that TDMAHf in the step (q1) was changed to tert-butylimino tri(ethylmethylamino)tantalum (TBTEMT).

Example 5A

A liquid jetting structure was obtained in the same manner as in the steps (p1) and (r1) to (v1) of Example 1A except that the step (q1) of Example 1A was changed to the following step (q5).

Step (q5): Formation of Titanium Oxide Layer

A titanium oxide layer was formed in the same manner as in the step (q1) except that TDMAHf in the step (q1) was changed to tetrakis(dimethylamino)titanium (TDMAT).

Example 6A

A liquid jetting structure was obtained in the same manner as in the steps (p1), (q1), and (s1) to (v1) of Example 1A except that the step (r1) of Example 1A was changed to the following step (r2).

Step (r2): Film Formation of Silicon Oxide

The bonded body after the step (q1) was disposed in an atomic layer deposition (ALD) chamber, and $H_2O$ gas was introduced to form a hydroxyl group on a surface of the bonded body. Next, tris(dimethylamino)silane (TDMAS) gas was introduced, and a hydroxyl group formed on the surface of the bonded body was reacted with TDMAS. After that, surplus gas was discharged. Next, $H_2O$ gas was introduced to react TDMAS bonded to the hydroxyl group in the previous reaction with $H_2O$. After that, surplus gas was discharged. Then, the introduction and discharge of TDMAS gas and the introduction and discharge of $H_2O$ gas were repeated as one cycle until a predetermined thickness (5 nm) was reached, thereby forming a silicon oxide layer.

Example 7A

A liquid jetting structure was obtained in the same manner as in the steps (p1), (q1), and (s1) to (v1) of Example 1A except that the step (r1) of Example 1A was changed to the following step (r3).

Step (r3): Film Formation of Silicon Oxide

The bonded body after the step (q1) was disposed in an atomic layer deposition (ALD) chamber, and $H_2O$ gas was introduced to form a hydroxyl group on a surface of the bonded body. Next, tris(dimethylamino)silane (TDMAS) gas was introduced, and a hydroxyl group formed on the surface of the bonded body was reacted with TDMAS. After that, surplus gas was discharged. Next, $H_2O$ gas was introduced to react TDMAS bonded to the hydroxyl group in the previous reaction with $H_2O$. After that, surplus gas was discharged. Then, the introduction and discharge of TDMAS gas and the introduction and discharge of $H_2O$ gas were repeated as one cycle until a predetermined thickness (30 nm) was reached, thereby forming a silicon oxide layer.

Example 8A

A liquid jetting structure was obtained in the same manner as in the steps (p1), (q1), and (s1) to (v1) of Example 1A except that the step (r1) of Example 1A was changed to the following step (r4).

Step (r4): Film Formation Of Silicon Oxide

The bonded body after the step (q1) was disposed in an atomic layer deposition (ALD) chamber, and $H_2O$ gas was introduced to form a hydroxyl group on a surface of the bonded body. Next, tris(dimethylamino)silane (TDMAS) gas was introduced, and a hydroxyl group formed on the surface of the bonded body was reacted with TDMAS. After that, surplus gas was discharged. Next, $H_2O$ gas was introduced to react TDMAS bonded to the hydroxyl group in the previous reaction with $H_2O$. After that, surplus gas was discharged. Then, the introduction and discharge of TDMAS gas and the introduction and discharge of $H_2O$ gas were repeated as one cycle until a predetermined thickness (120 nm) was reached, thereby forming a silicon oxide layer.

Example 9A

A liquid jetting structure was obtained in the same manner as in the steps (p1), (q1), and (s1) to (v1) of Example 1A except that the step (r1) of Example 1A was changed to the following step (r5).

Step (r5): Film Formation of Silicon Oxide

The bonded body after the step (q1) was disposed in an atomic layer deposition (ALD) chamber, and $H_2O$ gas was introduced to form a hydroxyl group on a surface of the bonded body. Next, tris(dimethylamino)silane (TDMAS) gas was introduced, and a hydroxyl group formed on the surface of the bonded body was reacted with TDMAS. After that, surplus gas was discharged. Next, $H_2O$ gas was introduced to react TDMAS bonded to the hydroxyl group in the previous reaction with $H_2O$. After that, surplus gas was discharged. Then, the introduction and discharge of TDMAS gas and the introduction and discharge of $H_2O$ gas were repeated as one cycle until a predetermined thickness (2.5 nm) was reached, thereby forming a silicon oxide layer.

Evaluation methods of Examples 1 to 11 and Comparative Examples 1 to 5

<Alkali Resistance of Surface of Nozzle Substrate>

Black ink disclosed in [0270] of JP2018-35270A was prepared. Ink whose pH was adjusted to 10 by adding sodium hydroxide to the prepared black ink was used as evaluation ink. The prepared liquid jetting structure was immersed in the evaluation ink and allowed to stand in a constant-temperature tank set at 60° C. After 200 hours had passed, a static contact angle on the surface of the nozzle substrate was measured using the newly prepared evaluation ink. The contact angle with the ink was measured under the condition of 25° C. by using a fully automatic contact angle meter (product name "DM-701", manufactured by Kyowa Interface Science Co., Ltd.). The alkali resistance was evaluated based on the contact angle. The evaluation standard is as follows. It can be said that the larger the contact angle, the better the alkali resistance.

5: The contact angle is 80° or more and less than 90°.
4: The contact angle is 70° or more and less than 80°.
3: The contact angle is 60° or more and less than 70°.
2: The contact angle is 50° or more and less than 60°.
1: The contact angle is less than 50°.

<Alkali Resistance of Internal Flow Passage>

Since the contact angle of the internal flow passage cannot be measured directly, the evaluation was performed using the following method instead.

First, in the examples and the comparative examples, the first step to the step (f1) in the manufacture of the liquid jetting structure were carried out, and the bonded body after the step (f1) was prepared. Then, by performing oxygen plasma treatment on the surface of the nozzle substrate, the liquid-repellent layer on the surface of the nozzle substrate was removed, and an evaluation structure was obtained. The surface condition of the nozzle substrate from which the liquid-repellent layer has been removed is the same as the surface condition of the internal flow passage in the liquid jetting structure.

The prepared liquid evaluation structure was immersed in the evaluation ink and allowed to stand in a constant-temperature tank set at 60° C. A surface roughness Ra of the nozzle substrate in the evaluation structure was measured before the immersion and after 600 hours had passed since the immersion. The surface roughness Ra was measured using an atomic force microscope (product name "Dimension icon with ScanAsyst", manufactured by BRUKER), and an average value measured at five points was adopted. The alkali resistance was evaluated based on a degree of change in the surface roughness Ra. The degree of change is expressed by a ratio (times) of the surface roughness Ra after the immersion to the surface roughness Ra before the immersion. The evaluation standard is as follows. It can be said that the smaller the degree of change in the surface roughness Ra, the better the alkali resistance.

5: The degree of change is less than 1.2 times.

4: The degree of change is 1.2 times or more and less than 1.5 times.

3: The degree of change is 1.5 times or more and less than 3 times.

2: The degree of change is 3 times or more and less than 5 times.

1: The degree of change is 5 times or more.

<Wipe Resistance of Surface of Nozzle Substrate>

The evaluation ink was added dropwise to a wiping member (product name "TORAYSEE", manufactured by Toray Industries, Inc.). The surface of the nozzle substrate in the prepared liquid jetting structure was pressed against the surface to which the ink was added dropwise at a constant pressure of 40 kPa and slid reciprocatively. After 10,000 times of reciprocating sliding, a static contact angle on the surface of the nozzle substrate was measured using the newly prepared evaluation ink. The contact angle with the ink was measured under the condition of 25° C. by using a fully automatic contact angle meter (product name "DM-701", manufactured by Kyowa Interface Science Co., Ltd.). The wipe resistance was evaluated based on the contact angle. The evaluation standard is as follows. It can be said that the larger the contact angle, the better the wipe resistance.

5: The contact angle is 80° or more and less than 90°.

4: The contact angle is 70° or more and less than 80°.

3: The contact angle is 60° or more and less than 70°.

2: The contact angle is 50° or more and less than 60°.

1: The contact angle is less than 50°.

<Jettability>

A wiping member (product name "TORAYSEE", manufactured by Toray Industries, Inc.) was pressed against the surface of the nozzle substrate in the prepared liquid jetting structure at a constant pressure of 40 kPa and slid reciprocatively 10 times.

Next, a liquid jetting head was prepared by bonding a diaphragm to the liquid jetting structure and arranging a piezoelectric element. The prepared liquid jetting head was incorporated into an ink jet recording experimental device.

Before operating the ink jet recording experimental device, liquid circulation with ink was performed for 15 minutes to remove ink remaining in the ink contact portion in the device. After that, the device was operated continuously for 1 hour to jet ink. After 1 hour, a wiping member (product name "TORAYSEE", manufactured by Toray Industries, Inc.) was pressed against the surface of the nozzle substrate at a constant pressure of 40 kPa and slid reciprocatively 50 times. After repeating the continuous jetting and the sliding operation 50 times, the number of nozzles that have caused a jetting failure was counted. The jetting failure includes a state in which ink is not jetted at all (non-jetting) and a state in which ink is jetted or not jetted (intermittent non-jetting). The jettability was evaluated based on the number of nozzles that have caused the jetting failure. The evaluation standard is as follows. It can be said that the smaller the number of nozzles that have caused the jetting failure, the better the jettability. In the liquid jetting structure, 2048 pieces of nozzles are formed.

5: The number of nozzles that have caused the jetting failure is 0.

4: The number of nozzles that have caused the jetting failure is 1 or 2.

3: The number of nozzles that have caused the jetting failure is 3 to 9.

2: The number of nozzles that have caused the jetting failure is 10 to 19.

1: The number of nozzles that have caused the jetting failure is 20 or more.

Evaluation Method of Examples 1A to 9A

<Alkali Resistance of Surface of Nozzle Substrate>

Black ink disclosed in [0270] of JP2018-35270A was prepared. Ink whose pH was adjusted to 10 by adding sodium hydroxide to the prepared black ink was used as evaluation ink. The prepared liquid jetting structure was immersed in the evaluation ink and allowed to stand in a constant-temperature tank set at 60° C. After 400 hours had passed, a static contact angle on the surface of the nozzle substrate was measured using the newly prepared evaluation ink. The contact angle with the ink was measured under the condition of 25° C. by using a fully automatic contact angle meter (product name "DM-701", manufactured by Kyowa Interface Science Co., Ltd.). The alkali resistance was evaluated based on the contact angle. The evaluation standard is as follows. It can be said that the larger the contact angle, the better the alkali resistance.

5: The contact angle is 80° or more and less than 90°.

4: The contact angle is 70° or more and less than 80°.

3: The contact angle is 60° or more and less than 70°.

2: The contact angle is 50° or more and less than 60°.

1: The contact angle is less than 50°.

<Alkali Resistance of Internal Flow Passage>

Since the contact angle of the internal flow passage cannot be measured directly, the evaluation was performed using the following method instead.

First, in the examples and the comparative examples, the first step to the step (f1) in the manufacture of the liquid jetting structure were carried out, and the bonded body after the step (f1) was prepared. Then, by performing oxygen plasma treatment on the surface of the nozzle substrate, the liquid-repellent layer on the surface of the nozzle substrate was removed, and an evaluation structure was obtained. The surface condition of the nozzle substrate from which the liquid-repellent layer has been removed is the same as the surface condition of the internal flow passage in the liquid jetting structure.

The prepared liquid evaluation structure was immersed in the evaluation ink and allowed to stand in a constant-temperature tank set at 60° C. A surface roughness Ra of the nozzle substrate in the evaluation structure was measured before the immersion and after 1000 hours had passed since the immersion. The surface roughness Ra was measured using an atomic force microscope (product name "Dimension icon with ScanAsyst", manufactured by BRUKER), and an average value measured at five points was adopted. The alkali resistance was evaluated based on a degree of change in the surface roughness Ra. The degree of change is expressed by a ratio (times) of the surface roughness Ra after the immersion to the surface roughness Ra before the immersion. The evaluation standard is as follows. It can be said that the smaller the degree of change in the surface roughness Ra, the better the alkali resistance.

5: The degree of change is less than 1.2 times.

4: The degree of change is 1.2 times or more and less than 1.5 times.

3: The degree of change is 1.5 times or more and less than 3 times.

2: The degree of change is 3 times or more and less than 5 times.

1: The degree of change is 5 times or more.

<Wipe Resistance of Surface of Nozzle Substrate>

The evaluation ink was added dropwise to a wiping member (product name "TORAYSEE", manufactured by Toray Industries, Inc.). The surface of the nozzle substrate in the prepared liquid jetting structure was pressed against the surface to which the ink was added dropwise at a constant pressure of 40 kPa and slid reciprocatively. After 20,000 times of reciprocating sliding, a static contact angle on the surface of the nozzle substrate was measured using the newly prepared evaluation ink. The contact angle with the ink was measured under the condition of 25° C. by using a fully automatic contact angle meter (product name "DM-701", manufactured by Kyowa Interface Science Co., Ltd.). The wipe resistance was evaluated based on the contact angle. The evaluation standard is as follows. It can be said that the larger the contact angle, the better the wipe resistance.

5: The contact angle is 80° or more and less than 90°.

4: The contact angle is 70° or more and less than 80°.

3: The contact angle is 60° or more and less than 70°.

2: The contact angle is 50° or more and less than 60°.

1: The contact angle is less than 50°.

<Jettability>

A wiping member (product name "TORAYSEE", manufactured by Toray Industries, Inc.) was pressed against the surface of the nozzle substrate in the prepared liquid jetting structure at a constant pressure of 40 kPa and slid reciprocatively 10 times.

Next, a liquid jetting head was prepared by bonding a diaphragm to the liquid jetting structure and arranging a piezoelectric element. The prepared liquid jetting head was incorporated into an ink jet recording experimental device.

Before operating the ink jet recording experimental device, liquid circulation with ink was performed for 15 minutes to remove ink remaining in the ink contact portion in the device. After that, the device was operated continuously for 1 hour to jet ink. After 1 hour, a wiping member (product name "TORAYSEE", manufactured by Toray Industries, Inc.) was pressed against the surface of the nozzle substrate at a constant pressure of 40 kPa and slid reciprocatively 50 times. After repeating the continuous jetting and the sliding operation 50 times, the number of nozzles that have caused a jetting failure was counted. The jetting failure includes a state in which ink is not jetted at all (non-jetting) and a state in which ink is jetted or not jetted (intermittent non-jetting). The jettability was evaluated based on the number of nozzles that have caused the jetting failure. The evaluation standard is as follows. It can be said that the smaller the number of nozzles that have caused the jetting failure, the better the jettability. In the liquid jetting structure, 2048 pieces of nozzles are formed.

5: The number of nozzles that have caused the jetting failure is 0.

4: The number of nozzles that have caused the jetting failure is 1 or 2.

3: The number of nozzles that have caused the jetting failure is 3 to 9.

2: The number of nozzles that have caused the jetting failure is 10 to 19.

1: The number of nozzles that have caused the jetting failure is 20 or more.

The evaluation results are shown in Table 1 and Table 2. In Tables 1 and 2, the first layer means the lowest layer provided in the nozzle substrate and the internal flow passage. The second layer means a layer provided on the first layer. The liquid-repellent layer is a layer provided on the second layer on the jetting surface of the nozzle substrate. For the liquid-repellent layer, whether or not it has a perfluoropolyether structure (PFPE structure) is described. For the first layer and the second layer, the types and thicknesses of components constituting the layers are described. In Tables 1 and 2, the term "second layer/first layer" means a ratio of the thickness of the second layer to the thickness of the first layer.

TABLE 1

| | Nozzle substrate | | | | | | Internal flow passage | |
|---|---|---|---|---|---|---|---|---|
| | Liquid-repellent layer | | Second layer | | First layer | | Second layer | |
| | Presence or absence of PFPE structure | Thickness (nm) | Type | Thickness (nm) | Type | Thickness (nm) | Type | Thickness (nm) |
| Example 1 | Present | 5 | $SiO_2$ | 30 | Tantalum oxide | 15 | $SiO_2$ | 30 |
| Example 2 | Present | 5 | $SiO_2$ | 30 | Zirconium oxide | 15 | $SiO_2$ | 30 |
| Example 3 | Present | 5 | $SiO_2$ | 30 | Titanium oxide | 15 | $SiO_2$ | 30 |

TABLE 1-continued

| | | | | | | | | |
|---|---|---|---|---|---|---|---|---|
| Example 4 | Present | 5 | $SiO_2$ | 30 | Hafnium oxide | 15 | $SiO_2$ | 30 |
| Example 5 | Present | 10 | $SiO_2$ | 30 | Tantalum oxide | 15 | $SiO_2$ | 30 |
| Example 6 | Present | 5 | SiN | 30 | Tantalum oxide | 15 | SiN | 30 |
| Example 7 | Present | 5 | $SiO_2$ | 30 | Tantalum oxide | 5 | $SiO_2$ | 30 |
| Example 8 | Present | 5 | $SiO_2$ | 30 | Tantalum oxide | 60 | $SiO_2$ | 30 |
| Example 9 | Present | 5 | $SiO_2$ | 5 | Tantalum oxide | 15 | $SiO_2$ | 5 |
| Example 10 | Present | 5 | $SiO_2$ | 15 | Tantalum oxide | 30 | $SiO_2$ | 15 |
| Example 11 | Absent | 5 | $SiO_2$ | 30 | Tantalum oxide | 15 | $SiO_2$ | 30 |
| Comparative Example 1 | Present | 5 | Tantalum oxide | 15 | $SiO_2$ | 30 | Tantalum oxide | 15 |
| Comparative Example 2 | Present | 5 | Plasma polymerization film | 30 | Tantalum oxide | 15 | Plasma polymerization film | 30 |
| Comparative Example 3 | Present | 5 | $SiO_2$ | 30 | Tantalum oxide | 15 | — | — |
| Comparative Example 4 | Present | 5 | — | — | $SiO_2$ | 30 | — | — |
| Comparative Example 5 | Present | 5 | — | — | Tantalum oxide | 15 | — | — |

| | Internal flow passage First layer | | Second | Evaluation | | | |
|---|---|---|---|---|---|---|---|
| | | | | Surface of nozzle substrate | | Internal flow passage | |
| | Type | Thickness (nm) | layer/first layer | Wipe resistance | Alkali resistance | Alkali resistance | Jettability |
| Example 1 | Tantalum oxide | 15 | 2 | 5 | 5 | 5 | 5 |
| Example 2 | Zirconium oxide | 15 | 2 | 5 | 5 | 5 | 5 |
| Example 3 | Titanium oxide | 15 | 2 | 5 | 5 | 3 | 5 |
| Example 4 | Hafnium oxide | 15 | 2 | 5 | 5 | 4 | 5 |
| Example 5 | Tantalum oxide | 15 | 2 | 5 | 5 | 5 | 4 |
| Example 6 | Tantalum oxide | 15 | 2 | 4 | 5 | 5 | 5 |
| Example 7 | Tantalum oxide | 5 | 6 | 5 | 4 | 3 | 5 |
| Example 8 | Tantalum oxide | 60 | 0.5 | 4 | 4 | 4 | 5 |
| Example 9 | Tantalum oxide | 15 | 0.3 | 3 | 5 | 5 | 5 |
| Example 10 | Tantalum oxide | 30 | 0.5 | 4 | 5 | 5 | 5 |
| Example 11 | Tantalum oxide | 15 | 2 | 4 | 5 | 5 | 5 |
| Comparative Example 1 | $SiO_2$ | 30 | 2 | 1 | 5 | 5 | 3 |
| Comparative Example 2 | Tantalum oxide | 15 | 2 | 2 | 5 | 5 | 4 |
| Comparative Example 3 | $SiO_2$ | 30 | 2 | 5 | 5 | 1 | 5 |
| Comparative Example 4 | $SiO_2$ | 30 | — | 5 | 4 | 1 | 5 |
| Comparative Example 5 | Tantalum oxide | 15 | — | 1 | 5 | 5 | 3 |

As shown in Table 1, in Examples 1 to 11, it was found that since the liquid jetting structure of the present disclosure comprises: a nozzle substrate on which a nozzle for jetting a liquid is formed; and a flow passage substrate on which a liquid flow passage communicating with the nozzle is fomied, in which a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON, the jetting surface is excellent in wipe resistance and the jetting surface and the internal flow passage are excellent in alkali resistance.

On the other hand, in Comparative Example 1, it was found that since the first layer is an $SiO_2$ layer and the second layer is a tantalum oxide layer on both the surface of the nozzle substrate and the inner wall of the internal flow passage, the jetting surface is inferior in wipe resistance.

In Comparative Example 2, it was found that since the second layer is a plasma polymerization film made of a silicone material on both the surface of the nozzle substrate and the inner wall of the internal flow passage, the jetting surface is inferior in wipe resistance.

In Comparative Example 3, it was found that since only an $SiO_2$ layer is provided on the inner wall of the internal flow passage, the internal flow passage is inferior in alkali resistance.

In Comparative Example 4, it was found that since only an $SiO_2$ layer is provided on the surface of the nozzle substrate and the inner wall of the internal flow passage, the internal flow passage is inferior in alkali resistance.

In Comparative Example 5, it was found that since only a tantalum oxide layer is provided on the surface of the nozzle substrate and the inner wall of the internal flow passage, the jetting surface is inferior in wipe resistance.

In Examples 1 and 2, it was found that since the first layer is a layer of tantalum oxide or zirconium oxide, the internal flow passage is excellent in alkali resistance as compared with Examples 3 and 4.

In Example 1, it was found that since the second layer is an $SiO_2$ layer, the jetting surface is excellent in wipe resistance as compared with Example 6.

In Example 1, it was found that since the thickness of the first layer is 10 nm to 50 nm, the jetting surface and the internal flow passage are excellent in alkali resistance as compared with Example 7, the jetting surface is excellent in wipe resistance as compared with Example 8, and the jetting surface and the internal flow passage are excellent in alkali resistance as compared with Example 8.

In Example 1, it was found that since the thickness of the second layer is 10 nm or more, the jetting surface is excellent in wipe resistance as compared with Example 9.

In Example 1, it was found that since the ratio of the thickness of the second layer to the thickness of the first layer is 0.8 or more, the jetting surface is excellent in wipe resistance as compared with Example 10.

In Example 1, it was found that since the liquid-repellent layer contains a silicon compound having a perfluoropolyether structure, the jetting surface is excellent in wipe resistance as compared with Example 11.

In Example 1, it was found that since the thickness of the liquid-repellent layer is 3 nm to 8 nm, the jettability is excellent in wipe resistance as compared with Example 5.

TABLE 2

| | Nozzle substrate | | | | | | Internal flow passage | | | | | Evaluation | | | |
|---|---|---|---|---|---|---|---|---|---|---|---|---|---|---|---|
| | Liquid-repellent layer | | Second layer | | First layer | | Second layer | | First layer | | Second | Surface of nozzle substrate | | Internal passage | |
| | Presence or absence of PFPE structure | Thickness (nm) | Type | Thickness (nm) | Type | Thickness (nm) | Type | Thickness (nm) | flow Type | Thickness (nm) | layer/ first layer | Wipe resistance | Alkali resistance | Alkali resistance | Jettability |
| Example 1A | Present | 5 | $SiO_2$ | 1 | Hafnium oxide | 30 | $SiO_2$ | 1 | Hafnium oxide | 30 | 0.03 | 5 | 5 | 5 | 5 |
| Example 2A | Present | 5 | $SiO_2$ | 1 | Hafnium oxide | 15 | $SiO_2$ | 1 | Hafnium oxide | 15 | 0.03 | 5 | 5 | 4 | 5 |
| Example 3A | Present | 5 | $SiO_2$ | 1 | Zirconium oxide | 30 | $SiO_2$ | 1 | Zirconium oxide | 30 | 0.03 | 5 | 5 | 5 | 5 |
| Example 4A | Present | 5 | $SiO_2$ | 1 | Tantalum oxide | 30 | $SiO_2$ | 1 | Tantalum oxide | 30 | 0.03 | 5 | 5 | 5 | 5 |
| Example 5A | Present | 5 | $SiO_2$ | 1 | Titanium oxide | 30 | $SiO_2$ | 1 | Titanium oxide | 30 | 0.03 | 5 | 5 | 3 | 5 |
| Example 6A | Present | 5 | $SiO_2$ | 5 | Hafnium oxide | 30 | $SiO_2$ | 5 | Hafnium oxide | 30 | 0.17 | 3 | 5 | 5 | 5 |
| Example 7A | Present | 5 | $SiO_2$ | 30 | Hafnium oxide | 30 | $SiO_2$ | 30 | Hafnium oxide | 30 | 1 | 4 | 4 | 5 | 5 |
| Example 8A | Present | 5 | $SiO_2$ | 120 | Hafnium oxide | 30 | $SiO_2$ | 120 | Hafnium oxide | 30 | 4 | 3 | 3 | 5 | 5 |
| Example 9A | Present | 5 | $SiO_2$ | 2.5 | Hafnium oxide | 30 | $SiO_2$ | 2.5 | Hafnium oxide | 30 | 0.08 | 4 | 5 | 5 | 5 |

As shown in Table 2, in Examples 1A to 9A, it was found that since the liquid jetting structure of the present disclosure comprises: a nozzle substrate on which a nozzle for jetting a liquid is formed; and a flow passage substrate on which a liquid flow passage communicating with the nozzle is formed, in which a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON, the jetting surface is excellent in wipe resistance and the jetting surface and the internal flow passage are excellent in alkali resistance.

In Examples 1A, 3A, and 4A, it was found that since the first layer is a layer of tantalum oxide, zirconium oxide, or hafnium oxide, the internal flow passage is excellent in alkali resistance as compared with Example 5A.

In Example 7A, it was found that since the thickness of the second layer is 10 nm to 100 nm, the jetting surface is excellent in wipe resistance and alkali resistance as compared with Example 8A.

In Examples 1A and 9A, it was found that since the thickness of the second layer is 0.3 nm to 3 nm, the jetting surface is excellent in wipe resistance as compared with Example 6A. Further, in Example 1A, it was found that since the thickness of the second layer is 0.3 nm to 2 nm, the jetting surface is excellent in wipe resistance as compared with Example 9A.

The entire disclosure of Japanese Patent Application No. 2020-061103, filed Mar. 30, 2020, is incorporated into the present specification by reference. In addition, all documents, patent applications, and technical standards described in the present specification are incorporated in the present specification by reference, to the same extent as in the case where each of the documents, patent applications, and technical standards is specifically and individually described.

What is claimed is:

1. A liquid jetting structure comprising:

a nozzle substrate on which a nozzle for jetting a liquid is formed; and a flow passage substrate on which a liquid flow passage communicating with the nozzle is formed, wherein a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON, wherein the liquid-repellent layer contains a compound having a perfluoropolyether structure, wherein the perfluoropolyether structure is a structure represented by any of the following Formulas 1 to 3:

$$CF_3O—(CF_2O)_n—(CF_2CF_2O)_m—* \quad (1)$$

$$CF_3—(CF_2OCF_2O)_n—* \quad (2)$$

$$CF_3—(CF_2O)_n—* \quad (3)$$

wherein in Formula 1, m represents an integer of 0 to 200, n represents an integer of 0 to 300, m+n is 1 or more, and * indicates a bonding position to other structures in the compound, in Formula 2, n represents an integer of 1 to 100, and * indicates a bonding position to other structures in the compound, in Formula 3, n represents an integer of 1 to 300, and * indicates a bonding position to other structures in the compound.

2. The liquid jetting structure according to claim 1, wherein the first layer is a layer of tantalum oxide, zirconium oxide, or hafnium oxide.

3. The liquid jetting structure according to claim 1, wherein the second layer is a $SiO_2$ layer.

4. The liquid jetting structure according to claim 1, wherein a thickness of the first layer is 10 nm to 50 nm.

5. The liquid jetting structure according to claim 1, wherein a thickness of the second layer is 0.3 nm to 3 nm or 10 nm to 100 nm.

6. The liquid jetting structure according to claim 1, wherein a thickness of the second layer is 0.3 nm to 2 nm.

7. The liquid jetting structure according to claim 1, wherein a ratio of a thickness of the second layer to a thickness of the first layer is 0.006 to 0.3.

8. The liquid jetting structure according to claim 1, wherein a thickness of the liquid-repellent layer is 3 nm to 8 nm.

9. The liquid jetting structure according to claim 1, wherein the liquid flow passage has a circulation flow passage for circulating a liquid.

10. A liquid jetting head comprising:

the liquid jetting structure according to claim 1.

11. A liquid jetting device comprising:

the liquid jetting head according to claim 10.

12. A liquid jetting device comprising:

a liquid circulation mechanism that circulates a liquid between the liquid jetting head according to claim 10 and a liquid tank.

13. The liquid jetting structure according to claim 1, wherein a thickness of the first layer is 10 nm to 30 nm.

14. A liquid jetting structure comprising:

a nozzle substrate on which a nozzle for jetting a liquid is formed; and a flow passage substrate on which a liquid flow passage communicating with the nozzle is formed, wherein a first layer, a second layer, and a liquid-repellent layer are provided in this order on a jetting surface of the nozzle substrate, the first layer and the second layer are provided in this order on an inner wall of the liquid flow passage, the first layer is a layer containing at least one selected from the group consisting of tantalum oxide, zirconium oxide, titanium oxide, and hafnium oxide, and the second layer is a layer containing at least one selected from the group consisting of $SiO_2$, SiC, SiN, SiCN, and SiON, wherein the liquid-repellent layer contains a compound having a perfluoropolyether structure, wherein the perfluoropolyether structure is a structure represented by the following Formula 1:

$$CF_3O—(CF_2O)_n—(CF_2CF_2O)_m—* \quad (1)$$

wherein in Formula 1, m represents an integer of 0 to 200, n represents an integer of 0 to 300, m+n is 1 or more, and * indicates a bonding position to other structures in the compound.

* * * * *